US010205411B2

(12) United States Patent
Jebai et al.

(10) Patent No.: US 10,205,411 B2
(45) Date of Patent: Feb. 12, 2019

(54) CONTROL METHOD FOR STARTING A SYNCHRONOUS ELECTRIC MOTOR

(71) Applicant: Schneider Toshiba Inverter Europe SAS, Pacy sur Eure (FR)

(72) Inventors: Al Kassem Jebai, Vernon (FR); Francois Malrait, Jouy sur Eure (FR); Thomas Devos, Carrieres sous Poissy (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 15/176,735

(22) Filed: Jun. 8, 2016

(65) Prior Publication Data
US 2017/0005597 A1   Jan. 5, 2017

(30) Foreign Application Priority Data

Jul. 1, 2015 (FR) ...................... 15 56191

(51) Int. Cl.
*H02P 21/06* (2016.01)
*H02P 1/52* (2006.01)
(Continued)

(52) U.S. Cl.
CPC .................. *H02P 1/52* (2013.01); *H02P 1/46* (2013.01); *H02P 6/20* (2013.01); *H02P 21/34* (2016.02)

(58) Field of Classification Search
CPC .... H02P 21/0035; H02P 21/06; H02P 21/146; H02P 2207/05; Y02T 10/643
(Continued)

(56) References Cited

U.S. PATENT DOCUMENTS 5,929,400 A * 7/1999 Colby ..................... H02P 21/16
                                                         187/290
5,998,957 A   12/1999 Tadmor et al.
(Continued)

FOREIGN PATENT DOCUMENTS

EP   1 213 828 A1   6/2002
JP   2004-282972    10/2004

OTHER PUBLICATIONS

French Preliminary Search Report (with Written Opinion) dated Mar. 14, 2016 in French Application 15 56191, filed on Jul. 1, 2015 (with English Translation of Categories of Cited Documents).
(Continued)

*Primary Examiner* — Rina Duda
(74) *Attorney, Agent, or Firm* — Oblon, McClelland, Maier & Neustadt, L.L.P.

(57) ABSTRACT

A control method implemented in a variable speed drive for starting a synchronous electric motor, said method including the application, as input, of a reference speed according to a predefined speed profile, the determination of a reference position based on the reference speed that is applied as input, the determination of a voltage in a rotating frame of reference, based on the reference speed that is applied as input, the determination of control voltages to be applied to each output phase depending, on the one hand, on the determined reference position and, on the other hand, on said voltage determined in the rotating frame of reference, and the application of the control voltages to each output phase to obtain an alignment of the position of the rotor of said motor with the reference position.

7 Claims, 5 Drawing Sheets

(51) Int. Cl.
*H02P 1/46* (2006.01)
*H02P 6/20* (2016.01)
*H02P 21/34* (2016.01)

(58) Field of Classification Search
USPC .......... 318/400.02, 727, 798, 801, 609, 610
See application file for complete search history.

(56) References Cited

U.S. PATENT DOCUMENTS

| | | | |
|---|---|---|---|
| 6,677,724 B1 | 1/2004 | Kim et al. | |
| 7,190,130 B2* | 3/2007 | Wogari .................. | H02P 21/18 318/400.02 |
| 7,902,790 B2* | 3/2011 | Arakawa ................ | H02P 23/08 318/400.02 |
| 8,115,441 B2* | 2/2012 | Romenesko ........... | H02P 21/16 318/727 |
| 2010/0109583 A1* | 5/2010 | Maekawa ........... | H02P 21/0003 318/400.02 |
| 2010/0264861 A1* | 10/2010 | Basic .................... | H02P 21/32 318/400.02 |
| 2013/0147410 A1 | 6/2013 | Head et al. | |
| 2015/0288311 A1 | 10/2015 | Head et al. | |

OTHER PUBLICATIONS

Combined Office Action and Search Report dated Jun. 11. 2018 in Chinese Patent Application No. 201610515585.X (submitting English language translation only), 10 pages.
AWFrench Preliminary Search Report (with Written Opinion) dated Mar. 14, 2016 in French Application 15 56191, filed on Jul. 1, 2015 (with English Translation of Categories of Cited Documents).

\* cited by examiner

CONTROL METHOD FOR STARTING A SYNCHRONOUS ELECTRIC MOTOR

TECHNICAL FIELD OF THE INVENTION

The present invention relates to a control method implemented in a variable speed drive for starting an electric motor connected to said variable speed drive. The control method is applicable to starting a synchronous electric motor and allows the rotor of this motor to be aligned with a reference position.

PRIOR ART

There exists a large number of different methods implemented in a variable speed drive for determining the initial position of the rotor of a permanent-magnet synchronous electric motor.

In a known manner, a variable speed drive comprises a rectifier module that provides a DC voltage from an external AC power supply network and an inverter (or chopper) module. This inverter module comprises power semiconductor electronic components for chopping the DC voltage using pulse width modulation (PWM), so as to provide, as output via a power cable, a pulsed variable voltage and a variable rotational frequency to the motor. A control device of the variable speed drive monitors the conduction and the blocking of the semiconductor components at the sampling frequency in order to control the motor using PWM with an appropriate variable voltage.

A variable speed drive operating in a closed loop for controlling a permanent-magnet synchronous motor generally uses an absolute position sensor for the rotor. However, this type of sensor has an especially high cost and problems with reliability (requirement for an additional cable, sensitivity to electromagnetic noise, etc.). It is therefore known practice, from the document JP1060287, to use an incremental encoder in order to know the relative position of the rotor. However, the use of an incremental encoder requires knowledge of the initial position of the rotor.

The document U.S. Pat. No. 7,202,618 proposes a solution that is implemented in a variable speed drive for determining the initial position of the rotor in a three-phase electric motor. This solution consists in sending voltage pulses through each of the phases of the motor for a determined period and in determining the peaks of currents that have flowed through the phases of the motor. Next, by comparing the currents obtained for each phase and based on relationships between the currents, the initial position of the rotor may be obtained without calculation. In one variant, stored tables allow the initial position of the rotor to be determined without calculation. In this document, the initial position of the rotor is indeed obtained without calculation but the various proposed solutions are complex and long to implement each time the motor is started. Moreover, these methods are based on side effects of the motor (magnetic saturation, saliency, etc.). However, there are motors that do not have sufficient saliency and others in which magnetic saturation does not have the expected effect. These prior methods may therefore prove to be inadequate.

Another method for determining the initial position of the rotor in a synchronous electric motor is described in the patent application EP1213828A1. The algorithm disclosed in this document consists in generating a speed control, determining a torque control to be applied depending on the speed control and the measured speed, then determining the initial angle based on the calculated torque control. It is therefore understood that the initial angle is deduced from the difference between the speed control and the measured speed.

The aim of the invention is to propose a method for controlling a synchronous electric motor that allows the rotor to be aligned simply, reliably and without constraints in terms of duration of alignment and torque applied upon starting. This method is based on the fundamental model of the motor and does not use side effects or non-linear effects. As such, it is robust and applicable to all types of synchronous motor (interior permanent magnet—IPM, surface permanent magnet—SPM or variable reluctance—SynRM).

SUMMARY OF THE INVENTION

This aim is achieved by a control method implemented in a variable speed drive for starting a synchronous electric motor equipped with a rotor and connected via output phases to said variable speed drive, said method comprising the following steps:
  the application, as input, of a reference speed according to a predefined speed profile, said speed profile being at least continuous and comprising a zero initial value, at least a non-zero value in order to cause the rotor of said motor to rotate and a zero final value;
  the determination of a reference position based on the reference speed that is applied as input;
  the determination of a voltage in a frame of reference rotating at the speed of the electric motor, based on the reference speed that is applied as input;
  the determination of control voltages to be applied to each output phase depending, on the one hand, on the determined reference position and, on the other hand, on said voltage determined in the rotating frame of reference;
  the application of the control voltages to each output phase to obtain an alignment of the position of the rotor of said motor with the reference position.

According to a first embodiment, the step of determining the voltage in the rotating frame of reference is carried out with control of the current and consists in:
  measuring the currents flowing through the output phases;
  transforming these currents measured in the three output phases into a measured flux current and a measured torque current;
  determining a reference flux current and a reference torque current based on the reference speed injected as input;
  determining the voltage in the rotating frame of reference by virtue of a proportional-integral controller that receives, as input, the measured flux current, the measured torque current, the reference flux current and the reference torque current.

According to a second embodiment, the step of determining the voltage in the rotating frame of reference is carried out without control of the current by applying a U/F type control law.

The invention also relates to a control system arranged in a variable speed drive for starting a synchronous electric motor equipped with a rotor and connected via output phases to said variable speed drive, said system comprising:
  a module for applying, as input, a reference speed according to a predefined speed profile, said speed profile being at least continuous and comprising a zero initial value, at least a non-zero value in order to cause the rotor of said motor to rotate and a zero final value;

a module for determining a reference position based on the reference speed that is applied as input;

a module for determining a voltage in a frame of reference rotating at the speed of the electric motor, based on the reference speed that is applied as input;

a module for determining control voltages to be applied to each output phase depending, on the one hand, on the determined reference position and, on the other hand, on said voltage determined in the rotating frame of reference;

a module for applying the control voltages to each output phase to obtain an alignment of the position of the rotor of said motor with the reference position.

According to a first variant embodiment, the module for determining the voltage in the rotating frame of reference is implemented with control of the current and comprises:

a module for measuring the currents flowing through the output phases;

a module for transforming the currents measured in the three output phases into a measured flux current and a measured torque current;

a module for determining a reference flux current and a reference torque current based on the reference speed injected as input;

a module for determining the voltage in the rotating frame of reference by virtue of a proportional-integral controller that receives, as input, the measured flux current, the measured torque current, the reference flux current and the reference torque current.

According to a second embodiment, the module for determining the voltage in the rotating frame of reference is implemented without control of the current by applying a U/F type control law.

It is understood from this general summary of the invention that the solution does not consist in determining the initial angle of the rotor, as is often the case in the solutions of the prior art. In the present invention, it is specifically a question of determining a control for aligning the rotor with a reference position that is chosen and defined by the reference speed trajectory applied as an input.

BRIEF DESCRIPTION OF THE FIGURES

Other features and advantages will appear in the following detailed description given in conjunction with the appended drawings in which.

DETAILED DESCRIPTION OF AT LEAST ONE EMBODIMENT

The control method of the invention is implemented in a variable speed drive for starting a synchronous electric motor. The control method is applicable to any synchronous electric motor, e.g. of variable reluctance type, non-salient or salient permanent magnet type, etc.

Figure 1:
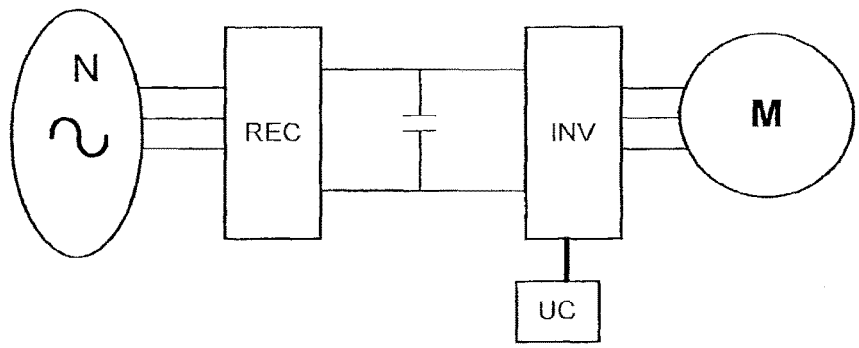
FIG. 1 shows the diagram of a variable speed drive that is connected to a synchronous electric motor.

Referring to FIG. 1, the variable speed drive is connected upstream to an electrical distribution network N by three input phases R, S, T. In a known manner, the variable speed drive comprises an input stage composed of a rectifier REC, e.g. of diode bridge type, that is arranged so as to rectify the AC voltage provided by the network N. The variable speed drive also comprises a DC power supply bus connected to the rectifier and comprising two power supply lines that are connected to one another by one or more bus capacitors. The variable speed drive also comprises an output stage composed of an inverter INV that receives a DC voltage provided by the DC power supply bus and controlled so as to provide variable voltages as output to the synchronous electric motor M, via three output phases a, b, c.

Figure 2:
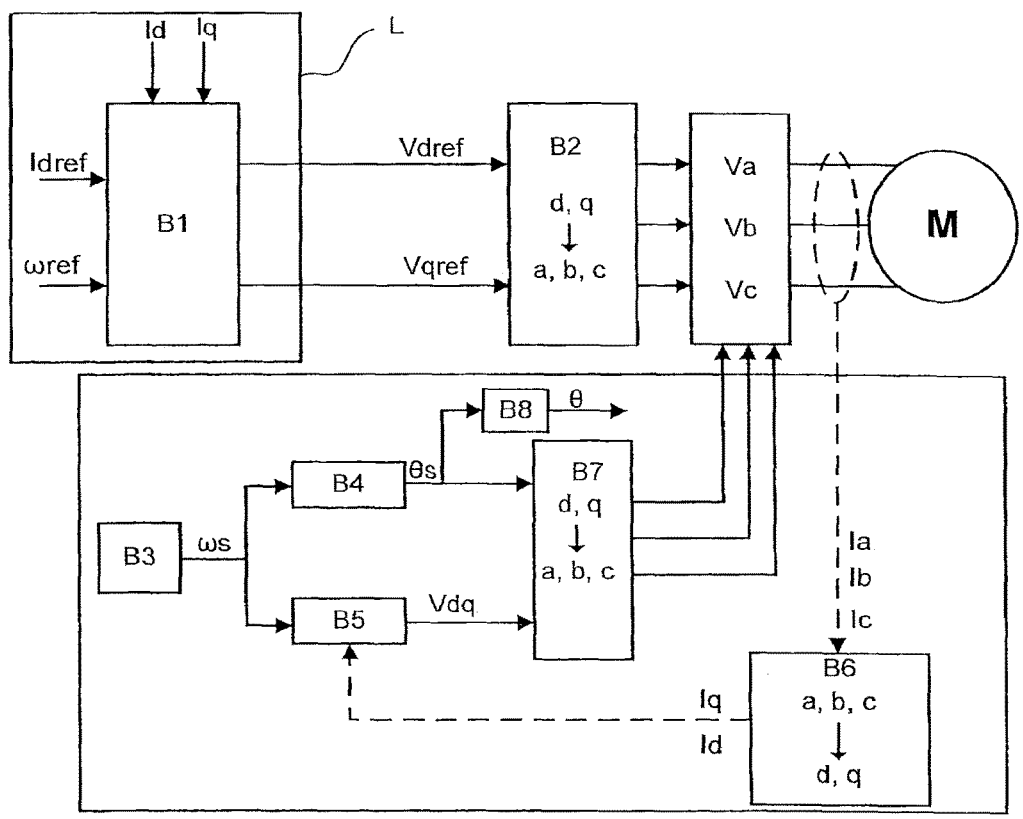
FIG. 2 is a diagrammatic representation of the overview of the control method of the invention.

In a known manner, the control unit UC of the variable speed drive implements a main control law L for controlling the inverter and determining the output voltages that are required for the operation of the electric motor M (block B1 in FIG. 2). Conventionally, this main control law L comprises, as input, a reference speed ωref based on which it determines a reference torque current (not shown). It also receives, as input, a reference flux current Idref. Based on the reference torque current and the reference flux current and measurements or estimations of the flux current Id and the torque current Iq, it determines reference voltages Vdref, Vqref based on which the single voltages Va, Vb, Vc to be applied to each output phase (block B2) are determined.

On starting the synchronous electric motor M, the position of the rotor is not known to the control unit UC of the variable speed drive, which prevents implementation of the main control law L. On starting the synchronous electric motor M, according to the invention, a specific sequence is implemented in order to align the rotor with a known position. The control method of the invention allows a sequence for starting (ST, FIG. 2) the rotation of the motor to be created. For starting the synchronous electric motor, the control method of the invention thus replaces the main control law L.

Referring to FIG. 2, the control method of the invention, implemented in the control unit UC for starting the synchronous electric motor, consists in applying, as input, a reference speed ωs that follows a predefined profile generated by a specific module (block B3). In the context of the invention, the predefined profile responds to certain constraints, namely the following:

the curve of the profile follows a continuous function of a class that is at least equivalent to C0;

the initial reference speed ωs is zero;

the reference speed ωs takes a value that is at least non-zero in order to cause the rotor to rotate;

the final reference speed is zero.

Advantageously, the predefined profile comprises a zero initial value, follows an increasing slope up to a maximum value, then a decreasing slope towards a zero final value. The maximum speed value is determined depending on the number of turns to be applied to the electric motor and the desired duration of alignment. The maximum frequency that corresponds to the maximum value of the speed applied to the motor thus follows the following relationship:

$$F_{DcMax} = \frac{2 \times RndNLD}{T_{pw} + T_{mw}}$$

In which:
RndNLD is the number of turns;
$(T_{pw}+T_{mw})$ is the total duration for the alignment;
$F_{DcMax}$ is the maximum rotational frequency in Hz;
the relationship between the maximum speed $\omega_{sMax}$ and the maximum frequency $F_{DcMax}$ is: $\omega_{sMax}=2\pi F_{DcMax}$ Referring to FIG. 2, based on the reference speed that follows the predefined profile described above, the control method of the invention determines:

a reference position θs (block B4) that the actual position of the rotor must approach. The reference position θs corresponds to the integral of the reference speed ωs. The expression for the reference frequency $f_s$ is:

$$f_s(t) = \begin{cases} F_{DcMax}\left(3\left(\dfrac{t}{T_{pw}}\right)^2 - 2\left(\dfrac{t}{T_{pw}}\right)^3\right) & \text{if } t < T_{pw} \\ F_{DcMax}\left(1 - 3\left(\dfrac{t-T_{pw}}{T_{mw}}\right)^2 + 2\left(\dfrac{t-T_{pw}}{T_{mw}}\right)^3\right) & \text{if } T_{pw} \leq t \leq T_{pw}+T_{mw} \\ 0 & \text{otherwise} \end{cases}$$

where the reference frequency fs is linked to the reference speed by $\omega_s=2\pi f_s$;
FDcMax is the maximum value of the reference frequency;
$T_{pw}$ is the time taken for the frequency to rise from zero to FDcMax;
$T_{mw}$ is the time taken for the frequency to fall from FDcMax to zero;
t is the duration from the start of the alignment sequence.

The reference position is obtained via the integral of the reference frequency as follows:

$$\theta_s = \int_0^t 2\pi f_s(u)du$$

The voltage Vdq (block B5) to be applied to the motor is determined with or without control of the current.

Referring to FIG. 2, determining the torque voltage and the flux voltage with control of the current consists in:
measuring the currents ia, ib, is flowing through the output phases;
transforming (block B6) these currents measured in the three output phases into a flux current and a torque current, by virtue of Park's transformation;
determining (block B5) a reference flux current idref and a reference torque current iqref based on the reference speed injected as input and which follows the above predefined profile;
determining (block B5) the voltage Vdq in the rotating frame of reference d, q by virtue of a proportional-integral controller that receives, as input, the measured flux current id, the measured torque current iq, the reference flux current idref and the reference torque current iqref.

The reference torque current and flux current are expressed by the following relationship:

$$i_{dq}^{ref} = \begin{cases} i_{dqMax}\dfrac{t}{t_i} & \text{if } t < t_i \\ i_{dqMax} & \text{if } t_i \leq t \leq T_{pw}+T_{mw}+T_{DcCurr} \\ 0 & \text{otherwise} \end{cases}$$

In which:
$i_{dMax}$ is the maximum value of the current on the axis d;
$i_{qMax}$ is the maximum value of the current on the axis q;
$t_i$ is the ramp time of the current on starting;
$T_{DcCurr}$ is the time for which the current is maintained at the end of the alignment sequence. The purpose of this DC current at the end of the alignment sequence is to ensure that the motor is stopped at the desired position.

As a variant embodiment, determining the voltage Vdq without control of the current (i.e. in an open loop, without measurement of the currents) consists in:
determining (block B5) the voltage in proportion to the reference speed (U/F type control law).

Based on the voltage Vdq and the determined reference position, the control method is able to determine (block B7) the voltages to be applied to the three output phases with the aim of allowing the rotor to be aligned with a known position. The output voltages are expressed in the following manner:

$$\begin{pmatrix} v_a \\ v_b \\ v_c \end{pmatrix} = \begin{pmatrix} 1 & 0 & \dfrac{\sqrt{2}}{2} \\ -\dfrac{1}{2} & \dfrac{\sqrt{3}}{2} & \dfrac{\sqrt{2}}{2} \\ -\dfrac{1}{2} & -\dfrac{\sqrt{3}}{2} & \dfrac{\sqrt{2}}{2} \end{pmatrix} \begin{pmatrix} \cos\theta_S & -\sin\theta_S \\ \sin\theta_S & \cos\theta_S \end{pmatrix} \begin{pmatrix} v_d \\ v_q \end{pmatrix}$$

FIGS. 4A to 4D, 5A to 5D and 6A to 6D illustrate simulation results for various operating cases.

Figure 4A:
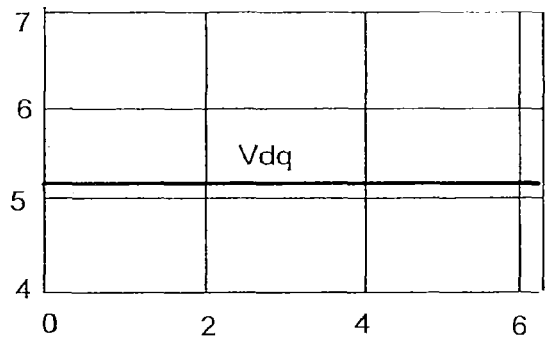
FIGS. 4A to 4D illustrate simulation results for a first operating situation.
Figure 4B:
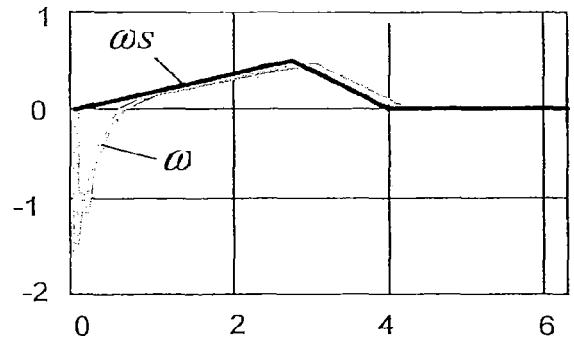
Figure 4C:
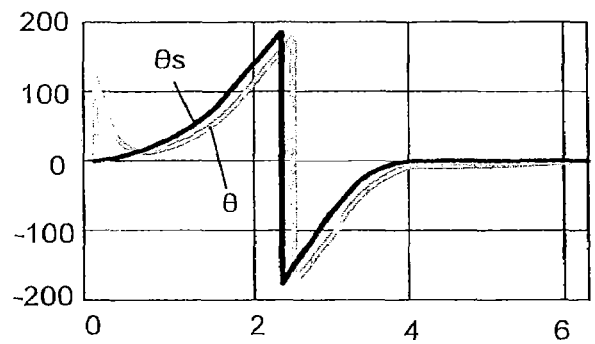
Figure 4D:
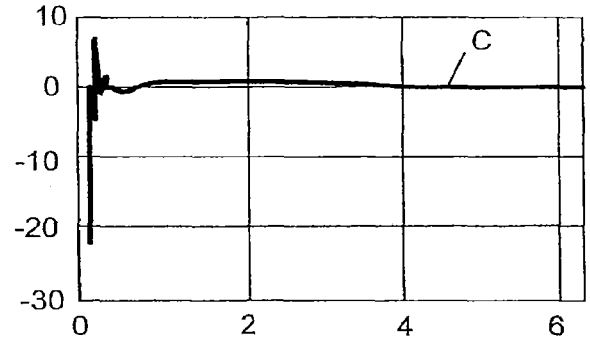

In a first operating case illustrated by FIGS. 4A to 4D, the generated voltage Vdq follows a constant (FIG. 4A) and the reference speed follows a predefined class C0 profile (FIG. 4B). FIG. 4C shows that the actual position of the rotor reaches the reference position at the end of the starting process. FIG. 4D shows that the torque C remains constant and that the starting process used does not generate jolts in the motor.

Figure 5A:
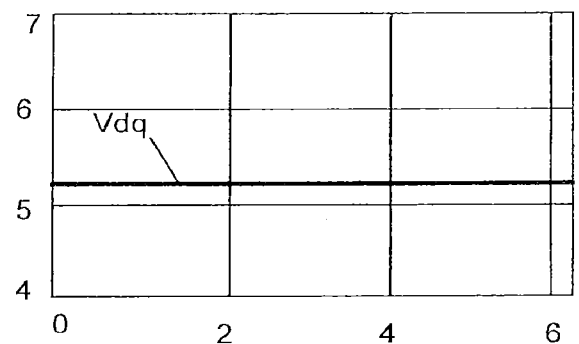
FIGS. 5A to 5D illustrate simulation results for a second operating situation.
Figure 5B:
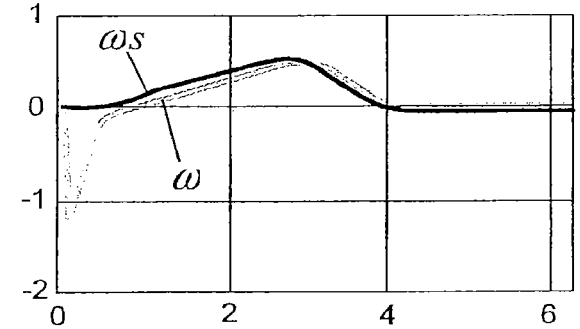
Figure 5C:
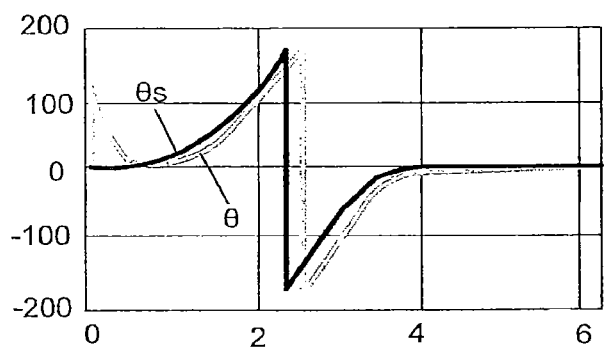
Figure 5D:
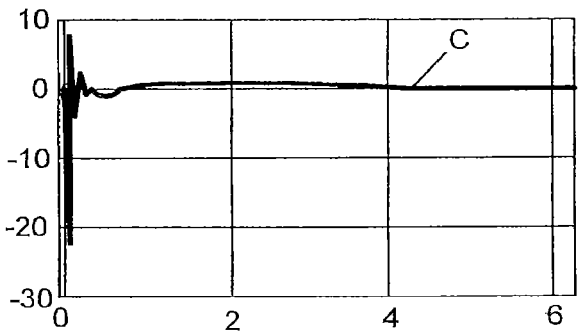

In a second operating case illustrated by FIGS. 5A to 5D, the generated voltage Vdq follows a constant (FIG. 5A) and the reference speed follows a predefined class C1 profile (FIG. 5B). FIG. 5C shows that the actual position of the rotor reaches the reference position at the end of the starting process. FIG. 5D shows that the torque C remains constant and that the starting process used does not generate jolts in the motor.

Figure 6A:
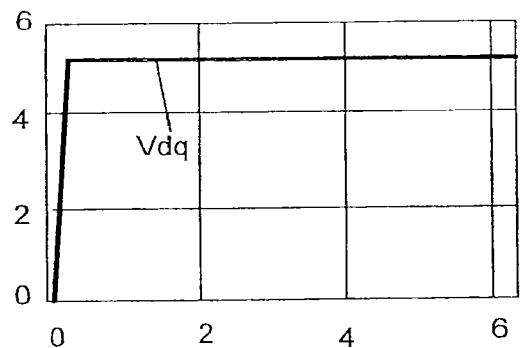
FIGS. 6A to 6D illustrate simulation results for a third operating situation.
Figure 6B:
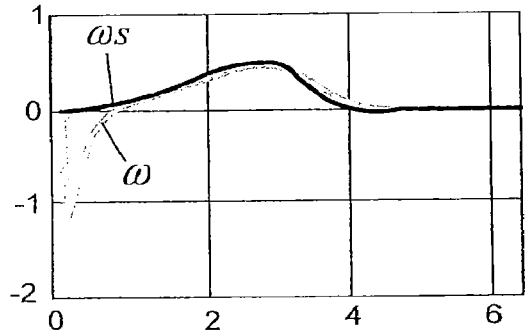
Figure 6C:
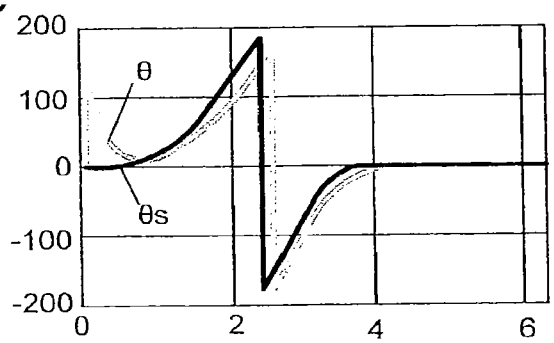
Figure 6D:
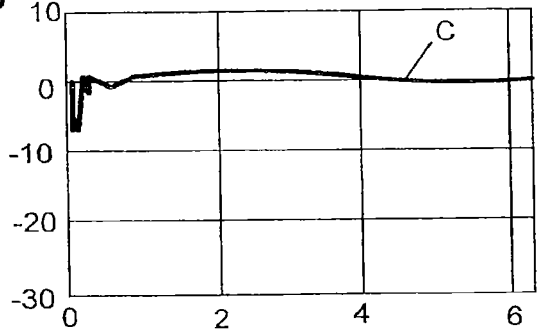

In a third operating case illustrated by FIGS. 6A to 6D, the generated voltage Vdq follows a trajectory that is not constant, but continuous (FIG. 6A), and the reference speed follows a predefined class C1 profile (FIG. 6B). FIG. 6C shows that the actual position of the rotor reaches the reference position at the end of the starting process. FIG. 6D shows that the torque C remains constant and that the starting process used does not generate jolts in the motor.

In FIG. 2, it can be noted that the determined reference position θs with which the rotor is aligned allows the actual position θ of the rotor (block B8) to be directly deduced, which may be of use in controlling the motor in normal operation.

The following demonstration makes it possible to show that:
there are equilibrium points in the system, depending on the load applied to the motor and voltage applied thereto;
these equilibrium points are stable or unstable;

the equilibrium point that interests us (minimum angle error) is stable and attainable.

Figure 3:
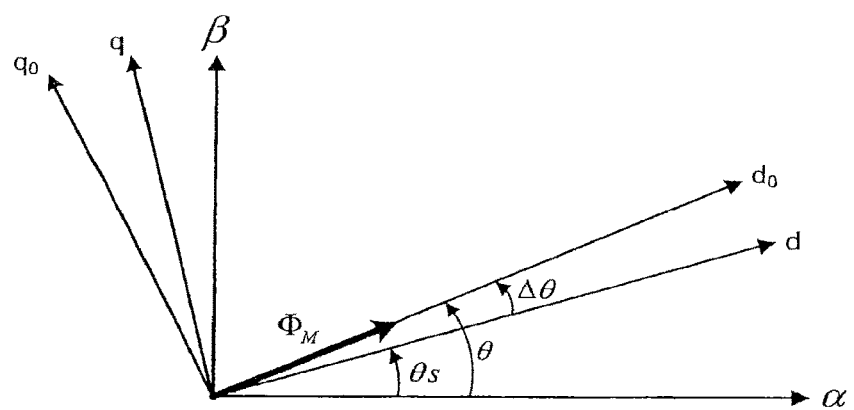
FIG. 3 illustrates the vectorial representation of a synchronous motor in a rotating frame of reference.

The equations for a synchronous motor in a rotating frame of reference (FIG. 3) are written as follows:

$$\begin{cases} \dfrac{d}{dt}\phi_{dq} = u_{dq} - Ri_{dq} - \omega_s \mathbb{J}\phi_{dq} - \omega\mathbb{J}\mathbb{R}_{\Delta\theta}\phi_M \\ \dfrac{J_M}{n_p}\dfrac{d\omega}{dt} = \dfrac{3}{2}n_p i_{dq}^T \mathbb{J}(\phi_{dq} + \mathbb{R}_{\Delta\theta}\phi_M) - T_L - f\omega \\ \dfrac{d}{dt}\Delta\theta = \omega - \omega_s \end{cases}$$

In which:

$$\begin{pmatrix} \phi_d \\ \phi_q \end{pmatrix}$$

is the electric flux;

$$\begin{pmatrix} i_d \\ i_q \end{pmatrix}$$

is the current of the motor;

$$\begin{pmatrix} \varphi_M \\ 0 \end{pmatrix}$$

is the flux of the permanent magnet;

$$\begin{pmatrix} u_d \\ u_q \end{pmatrix}$$

is the voltage of the motor in the rotating frame of reference;
R, Ld, Lq and $\varphi_M$ are the electrical parameters of the motor;
$J_M$ and $n_p$ are the mechanical parameters of the motor;
f is the coefficient of friction;
$\tau_L$ is the load torque;

$$\mathbb{L}_{dq} = \begin{pmatrix} L_d & 0 \\ 0 & L_q \end{pmatrix} = \lambda\mathbb{I} - \mu\mathbb{Z} = \begin{pmatrix} \lambda-\mu & 0 \\ 0 & \lambda+\mu \end{pmatrix},$$

$\lambda = (L_q + L_d)/2, \mu = (L_q - L_d)/2;$ $\phi_{dq} = \mathbb{R}_{\Delta\theta}\mathbb{L}_{dq}\mathbb{R}_{-\Delta\theta}i_{dq} = \lambda i_{dq} - \mu\mathbb{R}_{\Delta\theta}\mathbb{Z}\mathbb{R}_{-\Delta\theta}i_{dq};$ $\theta_s$ is the angle of the control, i.e. the reference position;
$\theta$ is the actual position of the rotor;
$\Delta\theta = \theta - \theta_s$;

$$\omega_s = \dfrac{d\theta_s}{dt}, \omega_s = \dfrac{d\theta}{dt};$$

$$\mathbb{I} = \begin{pmatrix} 1 & 0 \\ 0 & 1 \end{pmatrix}, \mathbb{J} = \begin{pmatrix} 0 & -1 \\ 1 & 0 \end{pmatrix}, \mathbb{Z} = \begin{pmatrix} 1 & 0 \\ 0 & -1 \end{pmatrix};$$

$$\mathbb{R}_{\Delta\theta} = \begin{pmatrix} \cos\Delta\theta & -\sin\Delta\theta \\ \sin\Delta\theta & \cos\Delta\theta \end{pmatrix}.$$

Control of the motor is carried out via the input voltage and $u_{dq}$ and the reference speed $\omega_s$. As the electrical part is the fastest, and without loss of generality, we consider that the current of the motor rapidly converges towards the reference of the current:

$$i_{dq} = \bar{i}_{dq}$$

In which $\bar{i}_{dq}$ is the reference of the current.

By way of example, the proof of stability is detailed below for a surface synchronous motor with the following characteristics: $L_d = L_q = L$ and $\mu = 0$.

Thus, to prove the convergence of the angle, it is necessary to study the mechanical equations for the motor, which in this case are written as follows:

$$\begin{cases} \dfrac{J_M}{n_p}\dfrac{d\omega}{dt} = \dfrac{3}{2}n_p \bar{i}_{dq}^T \mathbb{J}(\bar{\phi}_{dq} + \mathbb{R}_{\Delta\theta}\phi_M) - T_L - f\omega \\ \dfrac{d}{dt}\Delta\theta = \omega - \omega_s \end{cases}$$

Where $\bar{\phi}_{dq} = L\bar{i}_{dq}$

Equilibrium Points:

In this case, the equilibrium point is defined by:

$$\begin{cases} 0 = \dfrac{3}{2}n_p \bar{i}_{dq}^T \mathbb{J}(L\bar{i}_{dq} + \mathbb{R}_{\Delta\theta^{eq}}\phi_M) - T_L - f\omega^{eq} \\ 0 = \omega^{eq} - \omega_s \end{cases}$$

Where $\Delta\theta^{eq}$ and $\omega^{eq}$ are the equilibrium positions of the system.

We propose to write the references of the currents in polar form as follows:

$$\bar{i}_d = I\cos\alpha$$

$$\bar{i}_q = I\sin\alpha$$

Thus, the equilibrium is defined by:

$$\begin{cases} 0 = \dfrac{3}{2}n_p \varphi_M I \sin(\alpha - \Delta\theta^{eq}) - T_L - f\omega_s \\ \omega^{eq} = \omega_s \end{cases}$$

Finally we get:

$$\begin{cases} \sin(\alpha - \Delta\theta^{eq}) = \dfrac{T_L + f\omega_s}{\dfrac{3}{2}n_p\varphi_M I} \\ \omega^{eq} = \omega_s \end{cases}$$

There are two possible equilibrium points:

$\Delta\theta^{eq} = \alpha - \alpha_0$ or $\Delta\theta^{eq} = \alpha + \alpha_0 - \pi$ Where $\alpha_0 = \arcsin$ $$\left( \frac{\tau_L + f\omega_s}{\frac{3}{2} n_p \varphi_M I} \right),$$

it may be noted that $$-\frac{\pi}{2} \leq \alpha_0 \leq \frac{\pi}{2}$$

Stability Around the Equilibrium Points:
The system is written as follows:

$$\begin{cases} \dfrac{J_M}{n_p} \dfrac{d\omega}{dt} = \dfrac{3}{2} n_p \varphi_M I (\sin(\alpha - \Delta\theta) - \sin\alpha_0) - f(\omega - \omega_s) \\ \dfrac{d}{dt}\Delta\theta = \omega - \omega_s \end{cases}$$

The linearization of this system around the equilibrium $(\Delta\theta^{eq}, \omega^{eq})$ gives:

$$\left\{ \frac{d}{dt} \begin{pmatrix} \delta\omega \\ \delta\Delta\theta \end{pmatrix} = \begin{pmatrix} -\dfrac{fn_p}{J_M} & -\dfrac{3n_p^2 \varphi_M I}{2J_M} \cos(\alpha - \Delta\theta^{eq}) \\ 1 & 0 \end{pmatrix} \begin{pmatrix} \delta\omega \\ \delta\Delta\theta \end{pmatrix} \right.$$

Where $\delta\omega = \omega - \omega^{eq}$ and $\delta\Delta\theta = \Delta\theta - \Delta\theta^{eq}$.
The eigenvalues of the stability matrix are given by:

$$X^2 + \frac{fn_p}{J_M} X + \frac{3n_p^2 \varphi_M I}{2J_M} \cos(\alpha - \Delta\theta^{eq}) = 0$$

The system is stable if the three coefficients 1, $$\frac{fn_p}{J_M} \text{ and } \frac{3n_p^2 \varphi_M I}{2J_M} \cos(\alpha - \Delta\theta^{eq})$$

are positive.

By definition of the equilibrium positions, the equilibrium $\Delta\theta^{eq} = \alpha - \alpha_0$ is stable while the equilibrium $\Delta\theta^{eq} = \alpha + \alpha_0 - \pi$ it is unstable.

As a result, the only stable equilibrium position is $\Delta\theta^{eq} = \alpha - \alpha_0$. The solution is therefore:

$$\theta = \theta_s + \alpha - \alpha_0.$$

Thus, by using this expression for the angle, we get the position of the rotor.

The invention claimed is:

1. A control method implemented in a variable speed drive for starting a synchronous electric motor (M) equipped with a rotor and connected via output phases to said variable speed drive, said method comprising:
   applying, as input, a reference motor speed ($\omega s$) according to a predefined speed profile, said speed profile being at least continuous and comprising a zero initial value, at least a non-zero value in order to cause the rotor of said motor to rotate and a zero final value;
   determining a reference position ($\theta s$) based on the reference speed that is applied as input;
   determining a voltage (Vdq) in a frame of reference rotating at the speed of the electric motor, based on the reference speed that is applied as input;
   determining control voltages (Va, Vb, Vc) to be applied to each output phase depending on the determined reference position and on said voltage determined in the rotating frame of reference; and
   applying the control voltages (Va, Vb, Vc) to each output phase to obtain an alignment of the position of the rotor of said motor with the reference position ($\theta s$),
   wherein the non-zero value of the predefined speed profile includes a maximum speed value that is determined depending on at least one of a number of turns to be applied to the synchronous electric motor and a predetermined duration of alignment.

2. The control method according to claim 1, wherein the determining the voltage in the rotating frame of reference is carried out with control of the current and includes:
   measuring the currents (ia, ib, ic) flowing through the output phases;
   transforming these currents measured in the three output phases into a measured flux current and a measured torque current;
   determining a reference flux current (idref) and a reference torque current (iqref) based on the reference speed injected as input; and
   determining the voltage in the rotating frame of reference by virtue of a proportional-integral controller that receives, as input, the measured flux current (id), the measured torque current (iq), the reference flux current (idref) and the reference torque current (iqref).

3. The control method according to claim 1, wherein determining the voltage in the rotating frame of reference is carried out without control of the current by applying a U/F (volts per hertz) type control rule.

4. A control system arranged in a variable speed drive for starting a synchronous electric motor (M) equipped with a rotor and connected via output phases to said variable speed drive, said system comprising:
   processing circuitry configured to:
   apply, as input, a reference motor speed ($\omega s$) according to a predefined speed profile, said speed profile being at least continuous and comprising a zero initial value, at least a non-zero value in order to cause the rotor of said motor to rotate and a zero final value,
   determine a reference position ($\theta s$) based on the reference speed that is applied as input,
   determine a voltage (Vdq) in a frame of reference rotating at the speed of the electric motor, based on the reference speed that is applied as input,
   determine control voltages (Va, Vb, Vc) to be applied to each output phase depending on the determined reference position and, on said voltage determined in the rotating frame of reference, and
   apply the control voltages (Va, Vb, Vc) to each output phase to obtain an alignment of the position of the rotor of said motor with the reference position ($\theta s$),
   wherein the non-zero value of the predefined speed profile includes a maximum speed value that is determined depending on at least one of a number of turns to be applied to the synchronous electric motor and a predetermined duration of alignment.

5. The control system according to claim 4, wherein the processing circuitry is further configured to determine the voltage in the rotating frame of reference with control of the current by being configured to measure the currents (ia, ib, ic) flowing through the output phases, transform the currents measured in the three output phases into a measured flux current and a measured torque current, determine a reference flux current (idref) and a reference torque current (iqref) based on the reference speed injected as input, and determine the voltage in the rotating frame of reference by virtue of a proportional-integral controller that receives, as input, the measured flux current (id), the measured torque current (iq), the reference flux current (idref) and the reference torque current (iqref).

6. The control system according to claim 4, wherein the processing circuitry is further configured to determine the voltage in the rotating frame of reference without control of the current by applying a U/F (volts per hertz) type control rule.

7. The control system according to claim 4, wherein the non-zero value of the predefined speed profile includes a maximum speed value that is determined depending on both the number of turns to be applied to the synchronous electric motor and the predetermined duration of alignment.

* * * * *